(12) United States Patent
Lo

(10) Patent No.: US 8,629,945 B2
(45) Date of Patent: Jan. 14, 2014

(54) 3D LIQUID CRYSTAL DISPLAY SYSTEM

(71) Applicant: 3DV Co. Ltd., Hong Kong (CN)

(72) Inventor: Kwok Wah Allen Lo, Hong Kong (CN)

(73) Assignee: 3DV Co., Ltd., Chai Wan (HK)

( * ) Notice: Subject to any disclaimer, the term of this patent is extended or adjusted under 35 U.S.C. 154(b) by 0 days.

(21) Appl. No.: 13/847,675

(22) Filed: Mar. 20, 2013

(65) Prior Publication Data

US 2013/0215343 A1     Aug. 22, 2013

Related U.S. Application Data

(63) Continuation-in-part of application No. 12/661,488, filed on Mar. 17, 2010, now Pat. No. 8,427,591.

(51) Int. Cl.
*G02F 1/1335* (2006.01)

(52) U.S. Cl.
USPC ........ 349/15; 349/1; 349/56; 349/84; 349/96; 349/97

(58) Field of Classification Search
USPC ................................. 349/1, 15, 56, 84, 96, 97
See application file for complete search history.

(56) References Cited

U.S. PATENT DOCUMENTS

| | | | |
|---|---|---|---|
| 6,108,029 A | 8/2000 | Lo | |
| 6,914,656 B2 * | 7/2005 | Sakamoto et al. | 349/141 |
| 7,333,158 B2 * | 2/2008 | Chien et al. | 349/15 |
| 7,916,221 B2 | 3/2011 | Daiku | |
| 8,004,644 B2 | 8/2011 | Kurasawa | |

* cited by examiner

Primary Examiner — Jennifer Doan

(57) ABSTRACT

A viewing system has a parallax separation device placed in front of a liquid crystal display panel. The liquid display panel can be used to display a composite image that has many display segments, with each segment having two or more elongated image sections of different images. Each image section may occupy one or more columns of color pixels. The parallax separation device has a plurality of parallax separation elements, each aligned with a display segment for separating the different image sections as seen in a viewer's eyes. The parallax separation device has a barrier axis parallel to the longitudinal axis of the elongated image sections. The color sub-pixels in each pixel are arranged along a direction parallel to the barrier axis. A tracking device and a processor are used to determine the locations of image sections under the parallax separation elements based on positions of a viewer.

20 Claims, 13 Drawing Sheets

US 8,629,945 B2

3D LIQUID CRYSTAL DISPLAY SYSTEM

CROSS REFERENCE TO RELATED APPLICATION

This Continuation-In-Part application claims the benefit of pending U.S. patent application Ser. No. 12/661,488, filed Mar. 17, 2010.

FIELD OF THE INVENTION

The present invention relates to a 3D display system and, more particularly, to a 3D display system that uses a liquid crystal display panel as a display for providing images and/or information.

BACKGROUND OF THE INVENTION

It is known in the art that a liquid-crystal display (LCD) panel has a plurality of color pixels arranged in a two-dimensional array of rows and columns. As shown in FIG. 1, the LCD panel 10 has a plurality of pixel rows R1, R2, ..., Rm and a plurality of pixel columns C1, C2, ..., Cn. A pixel usually has three or more color sub-pixels, such as a red sub-pixel R, a green sub-pixel G and a blue sub-pixel B. In each pixel, each sub-pixel occupies an elongated area and the color sub-pixels are arranged along a horizontal axis.

If the LCD panel is used to provide images or information in a 3D display system for allowing a viewer to see two different views in two eyes. For example, if the right view (RV) is provided on the odd-numbered columns and the light view (LV) are provided on even-numbered columns as shown in FIG. 1, it is possible that the left eye (LE) only sees a single color in the left-view image and the right eye (RE) only sees a single color in the right-view image. Thus, the full-color image on the LCD panel cannot be seen.

It is advantageous to provide a 3D LCD system which allows a viewer to see all color components in a color image simultaneously.

SUMMARY OF THE INVENTION

The present invention provides a viewing system that has a parallax separation device placed in front of a liquid crystal display panel. The liquid display panel can be used to display a composite image that has many display segments, with each segment having two or more elongated image sections of different images. Each image section may occupy one or more columns of color pixels. The parallax separation device has a plurality of parallax separation elements, each aligned with a display segment for separating the different image sections in a viewer's eyes. The parallax separation device has a barrier axis parallel to the longitudinal axis of the elongated image sections. The color sub-pixels in each pixel are arranged along a direction parallel to the barrier axis.

Thus, the first aspect of the present invention is a viewing system comprising a liquid crystal display panel having a liquid crystal display panel comprising a plurality of color pixels arranged in a two-dimensional array of rows and columns, the rows arranged along a first direction and the columns arranged along a second direction different from the first direction, each pixel comprising a plurality of color sub-pixels; wherein each pixel has a pixel area and each color sub-pixel has a sub-pixel area and wherein the sub-pixel areas in a pixel are arranged in the pixel area along the second direction; a parallax separation device disposed in relationship to the liquid crystal display panel, the parallax separation device comprising a plurality of parallax separation elements, each parallax separation element having a longitudinal axis defining a parallax barrier axis of the parallax separation device, wherein the parallax barrier axis is substantially parallel to the second direction; and a tracking device configured to determine a position of a viewer viewing the liquid crystal display panel through the parallax separation device.

The parallax separation device can be a lenticular screen having a plurality of lenticules as parallax separation elements, or a parallax barrier device having alternate obscure and clear strips to form the parallax separation elements. The parallax barrier device can be made of a different liquid crystal display panel so that the pitch of the parallax separation elements can be adjusted and that the width of the obscure strips can also be adjusted. Also, the obscure sections can also be made clear so that the viewing system can be used to display a regular 2D image. Also, the barrier axis of the parallax barrier device can be changed from one direction to another.

The second aspect of the present invention is a method for use in a viewing system, the viewing system comprising liquid crystal display panel comprising a plurality of color pixels arranged in a two-dimensional array of rows and columns, the rows arranged along a first direction and the columns arranged along a second direction different from the first direction, each pixel comprising a plurality of color sub-pixels; wherein each pixel has a pixel area and each color sub-pixel has a sub-pixel area. The method comprises: arranging the sub-pixel areas in the pixel area along the second direction; providing a parallax separation device in relationship to the liquid crystal display panel, the parallax separation device comprising a plurality of parallax separator elements, each parallax separator element having a longitudinal axis defining a parallax barrier axis of the parallax separation device, wherein the parallax barrier axis is substantially parallel to the second direction; and determining a position of a viewer viewing the liquid crystal display panel through the parallax separation device so as to arrange a displayed image in the liquid crystal display pane The present invention will become apparent upon reading the description taken in conjunction with FIGS. 2 to 11b.

DETAILED DESCRIPTION OF THE INVENTION

Figure 1:
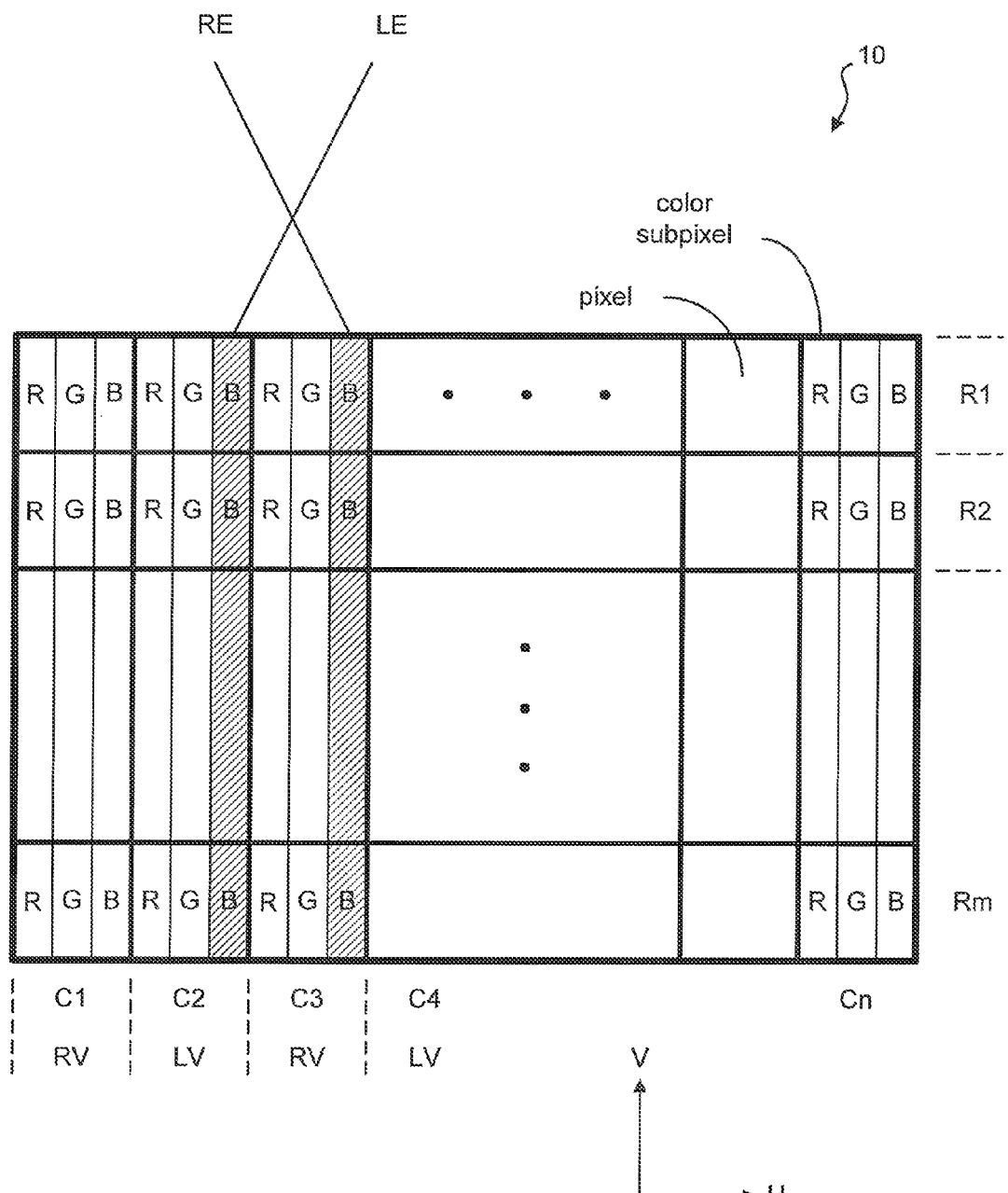
FIG. 1 shows a typical LCD panel.
Figure 2:
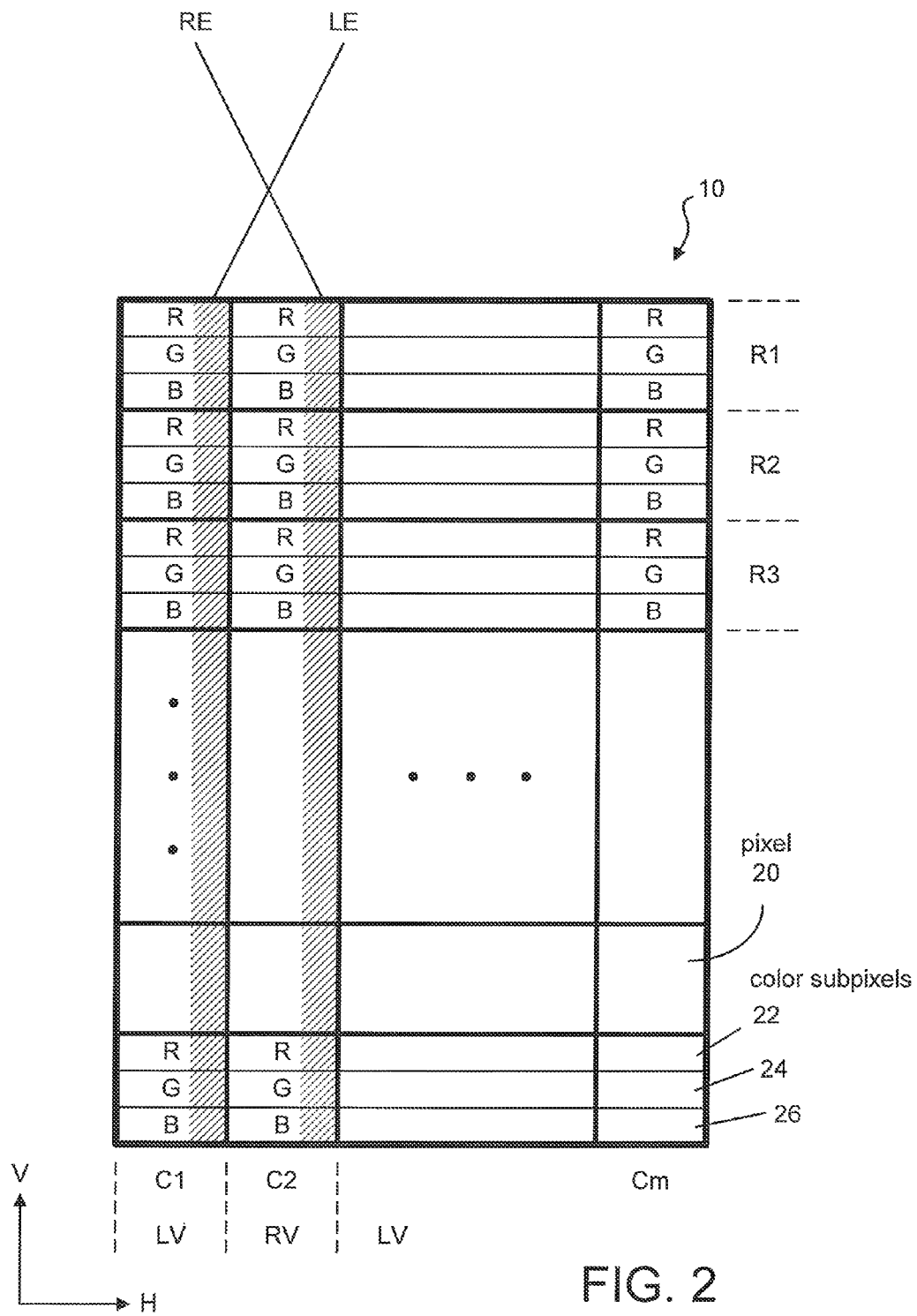
FIG. 2 shows an arrangement of the LCD panel for use in a 3D display system, according to one embodiment of the present invention.

When a 3D display system is arranged to allow a viewer to see the 3D image in an upright position, each of the viewer's eyes will see a plurality of left-view image sections and a plurality of right-view image sections. If the 3D image is provided on an LCD panel, each image section comprises one or more pixel columns. As shown in FIG. 2, the LCD panel 10 has a plurality of pixel rows R1, R2, R3, . . . and a plurality of columns C1, C2, . . . Each pixel 20 has three or more color sub-pixels 22, 24 and 26. For example, the color sub-pixels are red sub-pixel R, green sub-pixel G and blue sub-pixel B. Each color sub-pixel occupies an elongated area in the pixel. Each of the left-view image sections (LV) is provided in the image on an odd-numbered column and each of the right-view image sections (RV) is provided in the image on an even-numbered column. Under some circumstances, it is possible that the left eye (LE) sees only a vertical strip of each odd-numbered column and the right eye (RE) sees only a vertical strip of each even-numbered column.

As shown in FIG. 2, the LCD panel 10 is oriented such that the color sub-pixels 22, 24 and 26 (or R, G, B) in each pixel 20 are arranged along a vertical axis. As such, even when each eye can see only a vertical strip in a column, each eye sees all three colors in each pixel in the column.

Figure 3:
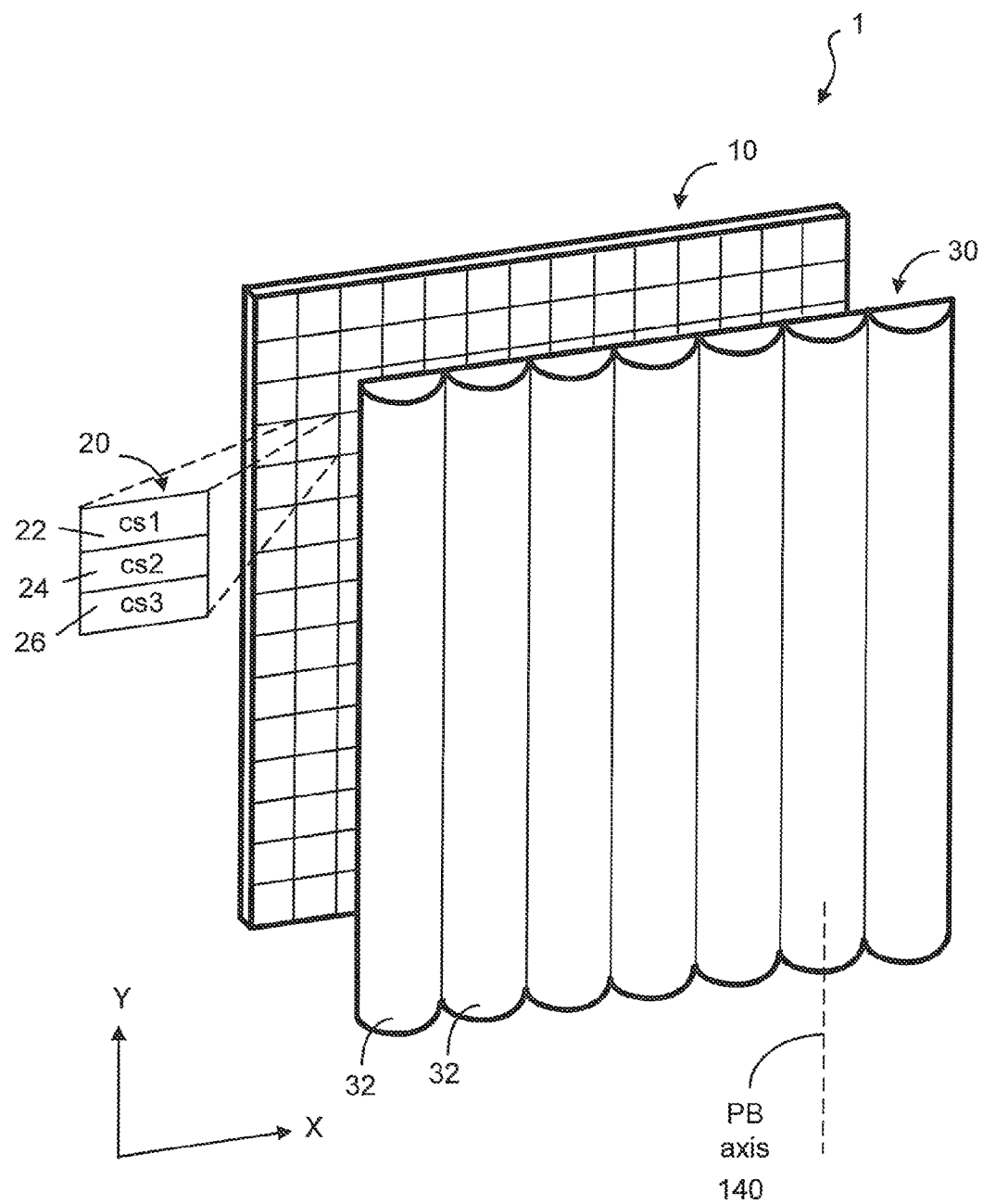
FIG. 3 is a schematic representation of an arrangement of a lenticular screen in relation to an LCD panel, according to one embodiment of the present invention.

To realize a 3D LCD system, a parallax separation device is placed in front of the LCD panel. The parallax separation device is used to separate the images representing views taken at different angles and displayed on the LCD panel. In the 3D LCD system 1 as shown in FIG. 3, a lenticular screen 30 in placed in relationship to a LCD panel 10. The lenticular screen 30 comprises a plurality of lenticules 32 to allow each of the viewer's eyes to see a different view displayed on the LCD panel 10 so that the left eye and the right eye of a viewer will be able to see different views (see FIG. 2). The lenticules 32 are sections of cylindrical lenses, each of which has a longitudinal axis defining a parallax barrier axis 140. The parallax barrier axis 140 is substantially parallel to the pixel columns of the LCD panel 10. Each of the pixels 20 has three or more color sub-pixels 22, 24 and 26 to display three different colors cs1, cs2 and cs3. These three colors can be red, green and blue, for example. However, each pixel 20 can have more than three color sub-pixels.

As shown in FIG. 3, the parallax barrier axis 140 is parallel to the Y axis. Thus, the pixel columns are also substantially parallel to the Y axis. In pixel 20, each of color sub-pixels 22, 24 and 26 occupies an elongated area, and the three elongated areas are arranged in a direction substantially parallel to the Y axis.

Figure 4:
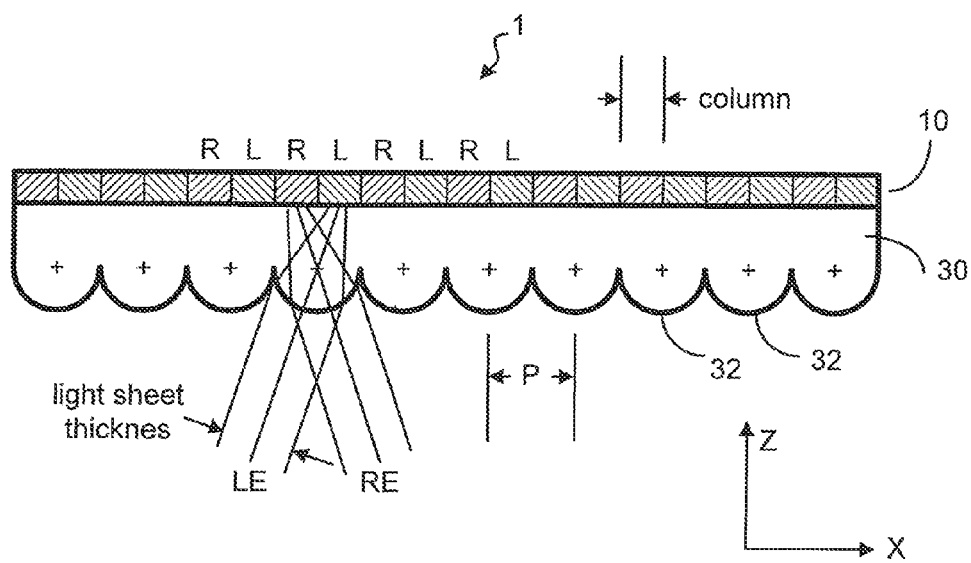
FIG. 4 is a schematic representation of a 3D LCD system with a lenticular screen.

FIG. 4 is a schematic representation of a 3D LCD system to show how a lenticular screen 30 can be used to separate a left view (L) from a right view (R). As shown, each lenticule 32 has a curved surface designed to focus a substantially parallel light beam on the display surface. Thus, through a lenticule, a section of the left-view image on the LCD panel 10 can only reach a viewer's left eye (LE) and a section of the right-view image can only reach the right eye (RE). The spatial separation between two adjacent lenticules is denoted as a pitch P. In FIG. 4, the pitch P is substantially equal to the width of two columns of the LCD panel 10. In general, the pitch P can be equal to three or more columns (see FIGS. 8a and 8b).

Figure 5:
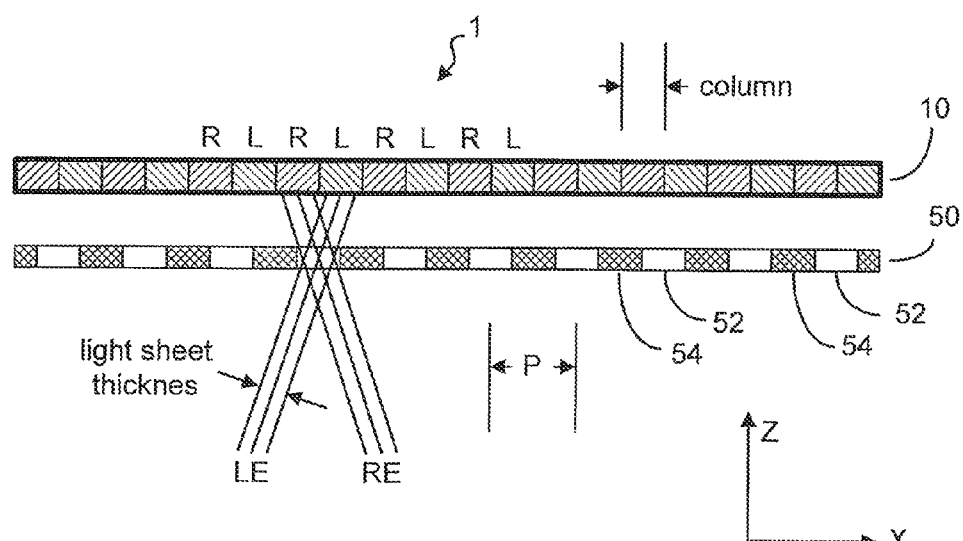
FIG. 5 is a schematic representation of a 3D LCD system with a parallax barrier panel.
Figure 6:
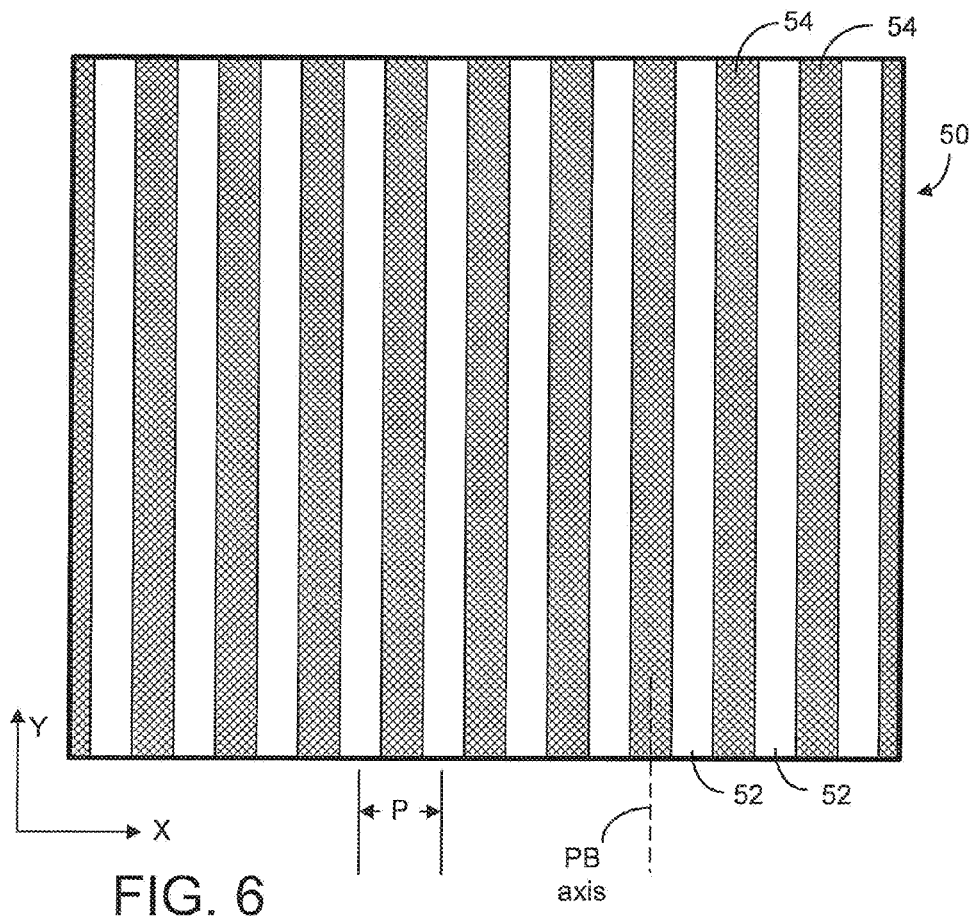
FIG. 6 is a schematic representation of a parallax barrier panel.

Instead of a lenticular screen, a parallax barrier panel can be used to separate a left view (L) from a right view (R). As shown in FIGS. 5 and 6, a parallax barrier panel 50 comprises a one-dimensional array of alternate clear and obscure strips. The obscure strips are designed to block a light beam from transmitting through the parallax barrier panel 50. As shown in FIG. 5, a section of the left view (L) can only reach a viewer's left eye (LE) through a clear section or strip 52. Likewise, a section of the right view (R) can only reach a viewer's right eye (RE) through the clear section 52. The obscure strips or sections are arranged to block the right view from the left eye and the left view for the right eye.

In a way, each lenticule on a lenticular screen functions as a parallax separation element. Likewise, each clear and obscure strip pair on a parallax barrier panel functions as a parallax separation element.

As with the case with a lenticular screen, the spatial separation between two adjacent clear sections or strips on a parallax barrier panel is denoted as a pitch P. In FIG. 5, the pitch P is substantially equal to the width of two columns. In general, the pitch P can be equal to three or more columns (see FIGS. 9a and 9b). Since the LCD display panel 10 and the parallax separation device (30, 50) are two dimensional panels, the two light beams transmitted through each lenticule 32 or through each clear section 52 form two light sheets with a light sheet thickness.

Figure 7:
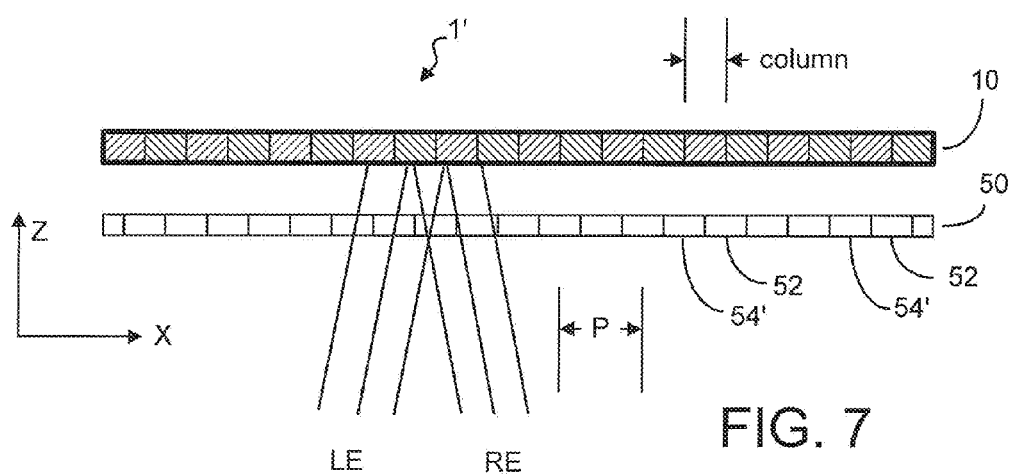
FIG. 7 shows a 3D LCD system wherein the obscure sections in a parallax barrier panel have been cleared.

A parallax barrier panel 50 can be made by cutting out a series of strips on a piece of metal plate, a piece of opaque cardboard, or a sheet of opaque plastic, for example. A parallax barrier panel can also be made by printing a series of strips of dark ink on a clear substrate, for example. A parallax barrier panel can also be made from a light valve which can be electrically controlled to produce an array of alternate clear and obscure strips. For example, a parallax barrier panel can be made from a separate liquid crystal display panel. An optical parallax barrier panel such as a light-valve or liquid-crystal type parallax barrier panel can be turned on or off. Thus, the optical parallax barrier panel is operable in a first state and in a second state. When the optical parallax panel is operated in the first state, the entire panel is clear. When the optical parallax panel is operated in the second state, it comprises a series of obscure strips 54 as shown in FIG. 6. Thus, when the optical parallax panel is operated in the first state, the obscure strips become clear strips 54', as shown in FIG. 7. Since light can transmit through the clear strips 52 and the clear strips 54', an image section on the LCD panel 10 can be viewed by both the left eye (LE) and the right eye (RE) simultaneously.

With a parallax barrier panel operable in a first state and in a second state as described above, the 3D LCD system 1 as shown in FIG. 5 can be turned into a 2D LCD system 1' as shown in FIG. 7. With a 2D display, there is no needed to provide a composite image with alternate sections of the left view (L) and the right view (R) as shown in FIG. 5. Instead, a regular image can be displayed on the LCD panel 10 as shown in FIG. 7.

Figure 8A:
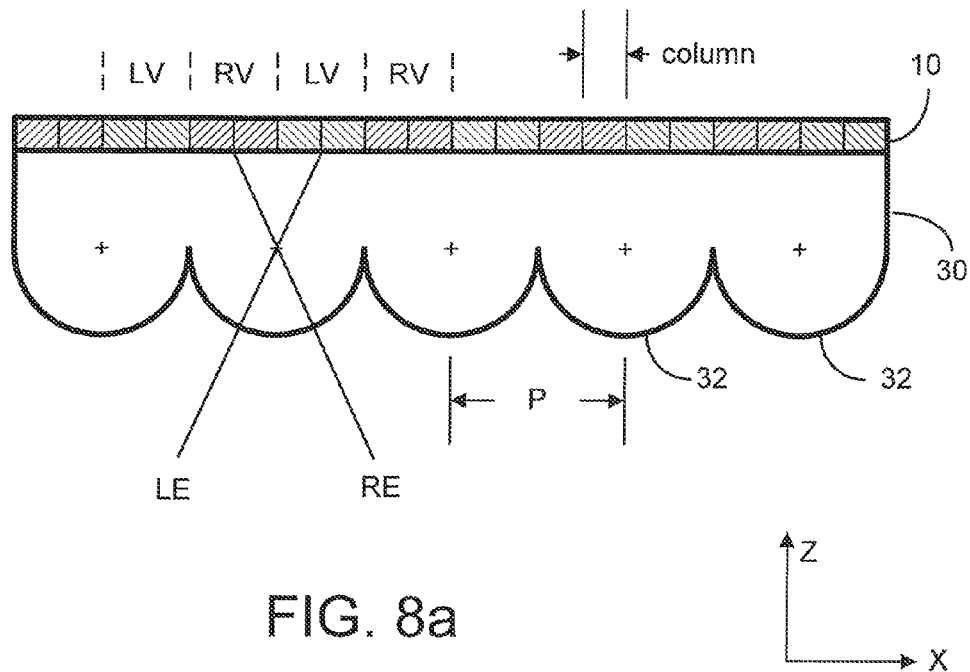
FIG. 8a shows a 3D LCD system with a lenticular screen wherein each of the left-view and the right view under a lenticule occupies two columns of the LCD panel.
Figure 9A:
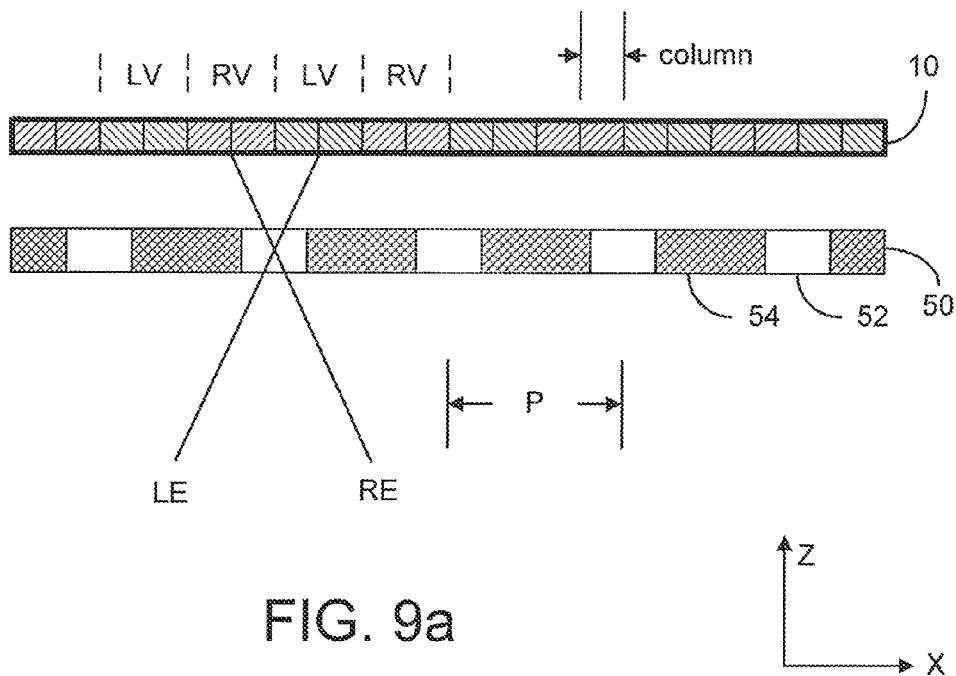
FIG. 9a shows a 3D LCD system with a parallax barrier panel wherein each of the left-view and the right view under a barrier pitch occupies two columns of the LCD panel.
Figure 8B:
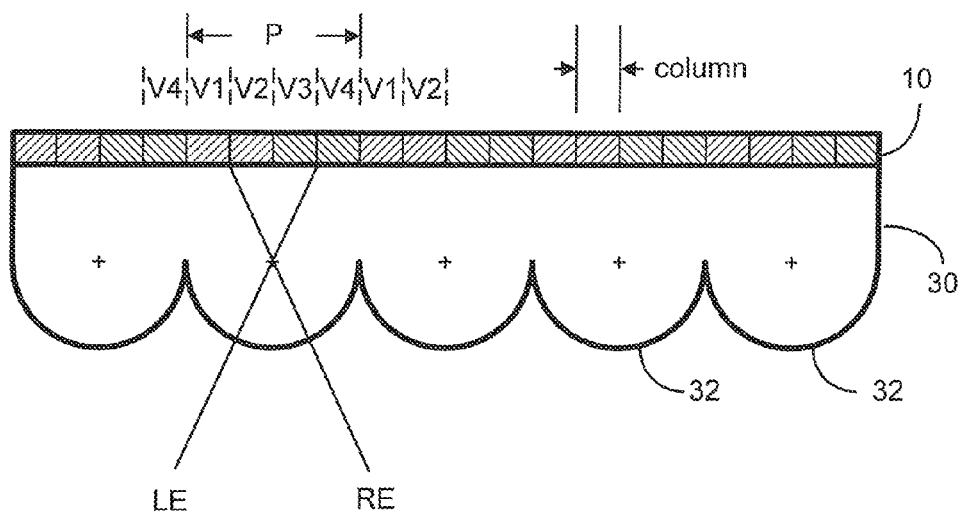
FIG. 8b shows a 3D LCD system with a lenticular screen wherein four different views under a lenticule occupy four columns of the LCD panel.
Figure 9B:
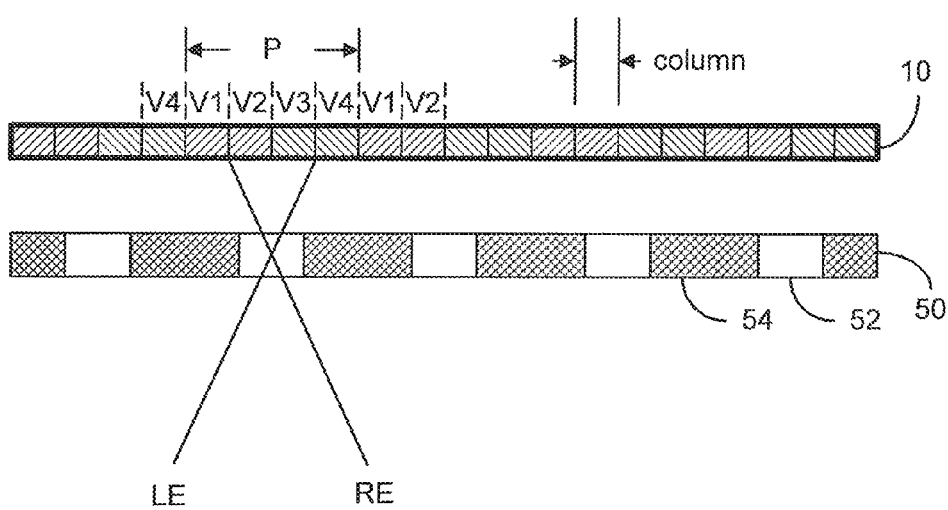
FIG. 9b shows a 3D LCD system with a parallax barrier panel wherein four different views under a barrier pitch occupy four columns of the LCD panel.

It should be understood that, in a 3D LCD system comprising a LCD display panel and a parallax separation device such as a lenticular screen 30 or a parallax barrier panel 50, the pitch P can be substantially equal to or slightly smaller than the width of two columns as shown in FIGS. 4 and 5. However, the pitch P can be substantially equal to the width of three, four or more columns. As shown in FIGS. 8a and 9a, the pitch P is substantially equal or slight smaller than the width of four columns. As such, a section of the left view image (LV) can be displayed on two columns and a section of the right view image (RV) can be displayed on the other two columns. It should be understood that, three, four or more views can be displayed on the LCD panel 10. For example, the pitch P is substantially equal or slightly smaller than the widths of four columns and a section of each of four different views (V1, V2, V3, V4) occupies a column as shown in FIGS. 8b and 9b. Thus, in general, two or more different view sections can be arranged under a pitch P and each view section can occupy one, two or more columns of the LCD panel.

The right and left views R, L (or RV, LV) as shown in FIGS. 4, 5, 8a and 9a represent a composite image displayed on the liquid crystal display panel 10. The image views displayed under each parallax separation element is a segment of the composite image. Thus, in general, each segment of the composite image has two or more displayed sections of different views. In FIGS. 4, 5, 8a and 9a, each segment of the composite image has two displayed sections of two different views. In FIGS. 8b and 9b, each segment of the composite image has four displayed sections of four different views, V1-V4. In FIGS. 4, 5, 8b and 9b, each of the different views is displayed on a pixel column of the liquid crystal panel 10. In FIGS. 8a and 9b, each of the different views is displayed on two pixel columns. In FIGS. 4 and 5, the width of each segment of the composite image is equal to two pixel columns. In FIGS. 8a, 8b, 9a and 9b, the segment width is equal to four pixel columns, but the segment width can also be equal to three, five, six or a different number of pixel columns. In general, each of the different views can be displayed on one, two, three or more pixel columns, and each segment of the composite image may have two, three, four or more displayed segments of different views. The different views that compose the composite image can be images of a scene taken at different angles, or images of different scenes, unrelated scenes, different pictures, different graphic designs or various combinations thereof.

With an optical parallax barrier panel such as a light-valve type or a liquid crystal type panel 50 as shown in FIGS. 5 and 6, it is possible to adjust the width of the obscure sections, without changing the pitch P, to change the thickness of the light sheet thickness (see FIG. 5).

Figure 10A:
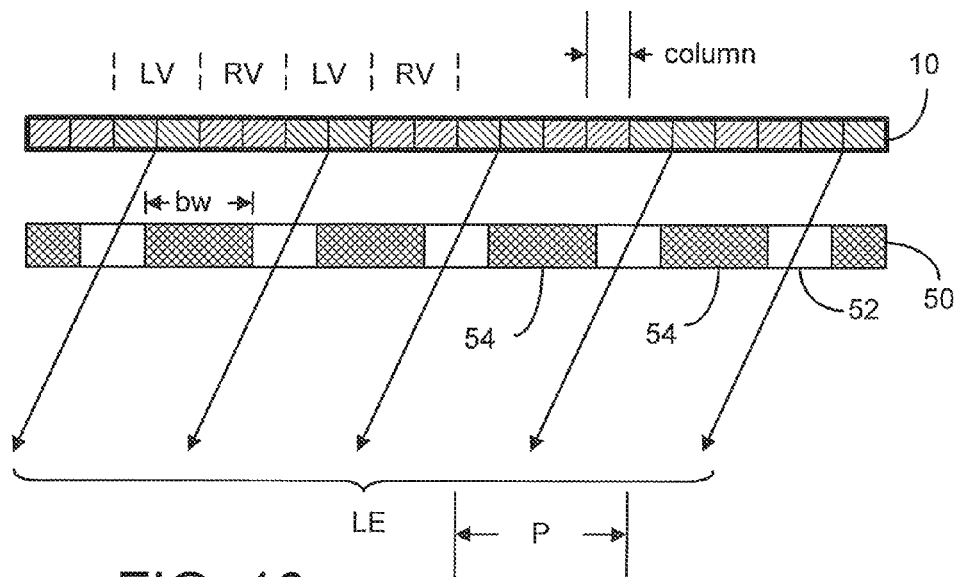
FIGS. 10a and 10b show a 3D LCD system with a parallax barrier panel wherein the pitch of the obscure sections can be adjusted.
Figure 10B:
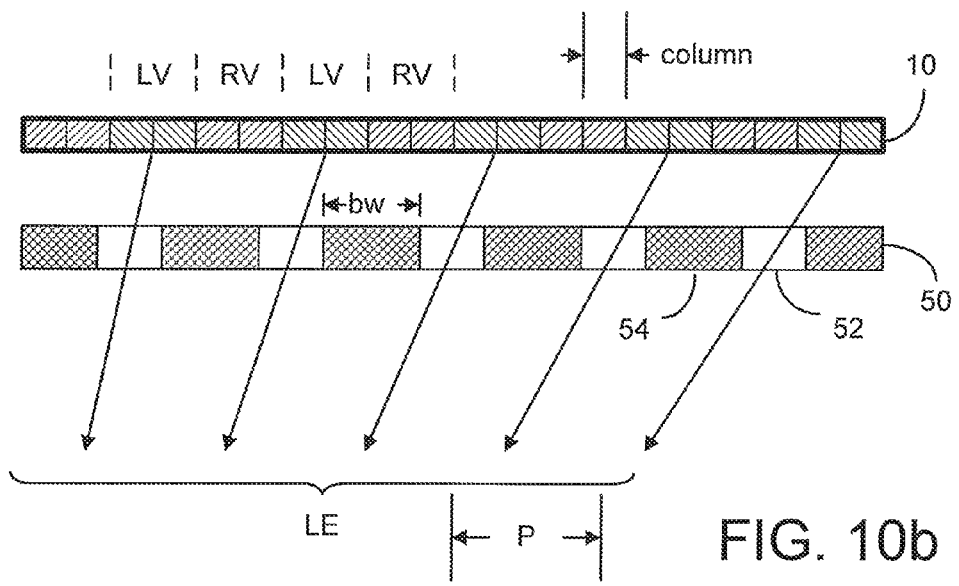

Also, it is possible to change the pitch P to match the width of the columns of an LCD panel. As such, it is possible to use the same parallax barrier panel on LCD panels of different resolutions, for example. Furthermore, the pitch P can be adjusted depending on the viewing distance. When a viewer views the display image from a 3D LCD system at a distance, the light beams that reach a viewer's eye are substantially parallel as shown in FIG. 10a. When the viewer moves closer in, the light beams become more converged as shown in FIG. 10b. It is advantageous that the pitch P and/or the barrier width (bw) of the obscure sections can be adjusted.

Figure 11A:
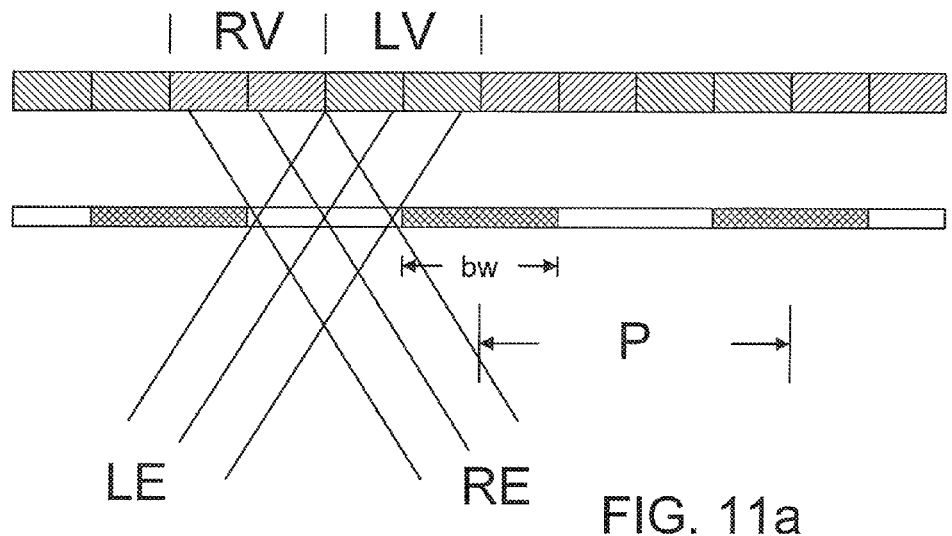
FIGS. 11a and 11b show a parallax barrier panel with adjustable pitch and adjustable barrier width.
Figure 11B:
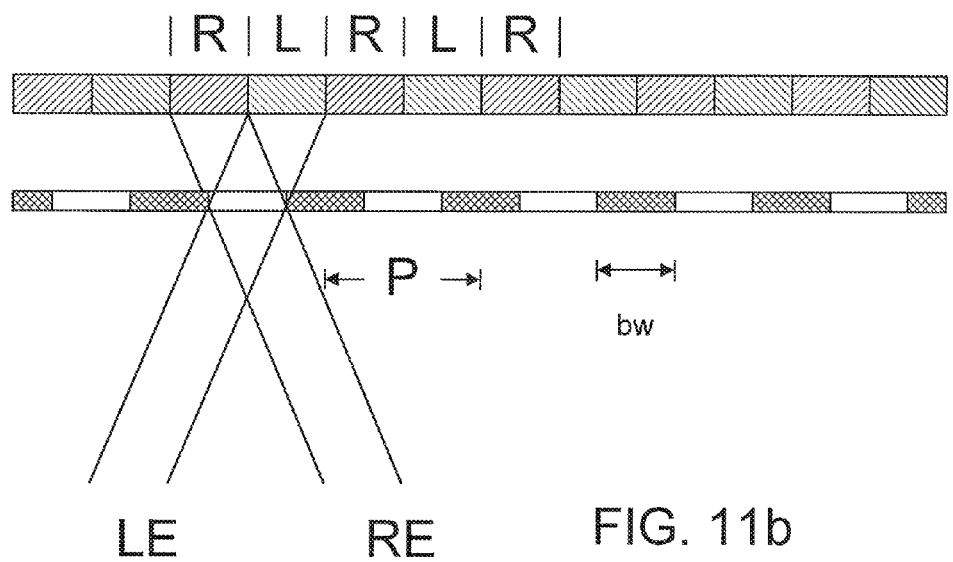

In FIGS. 11a and 11b, both the pitch P and the barrier width bw can be adjustable dependent upon how the composite image of the LCD image is composed. In FIG. 11a, two columns are used to display a section of the right view (RV) and the adjacent two columns are used to display a section of the left view (LV). In FIG. 11b, each section of the right view and each section of the left view occupy only one column.

Figure 12A:
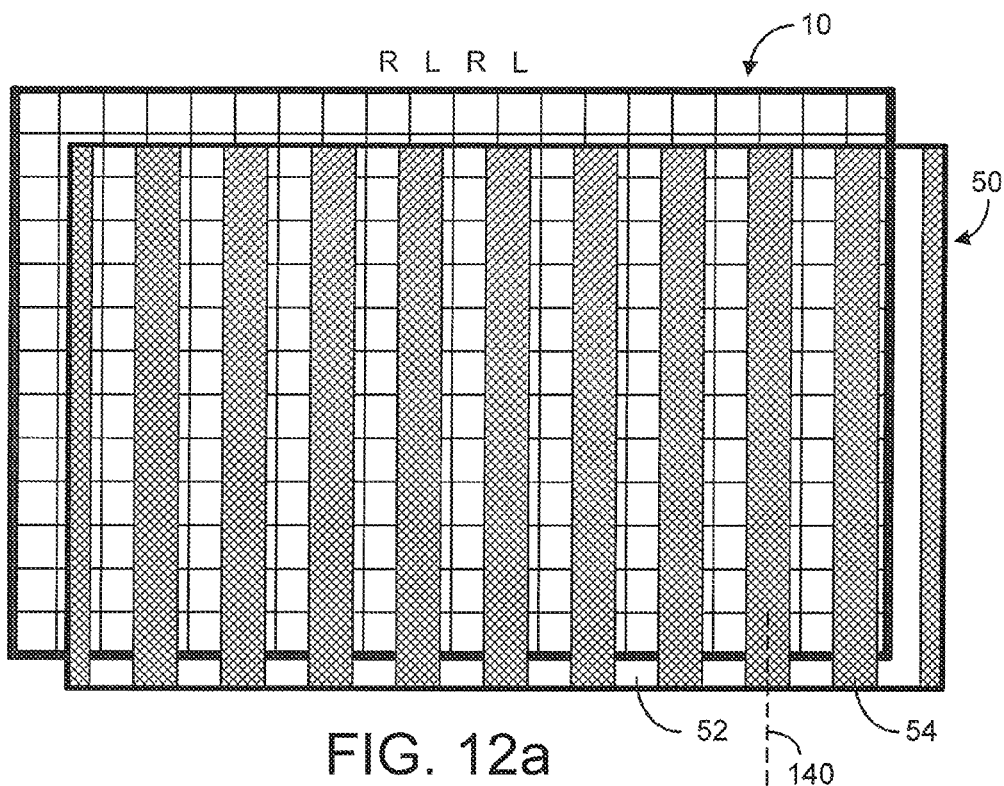
FIGS. 12a and 12b show a parallax barrier panel configured to change the axis of the barriers.
Figure 12B:
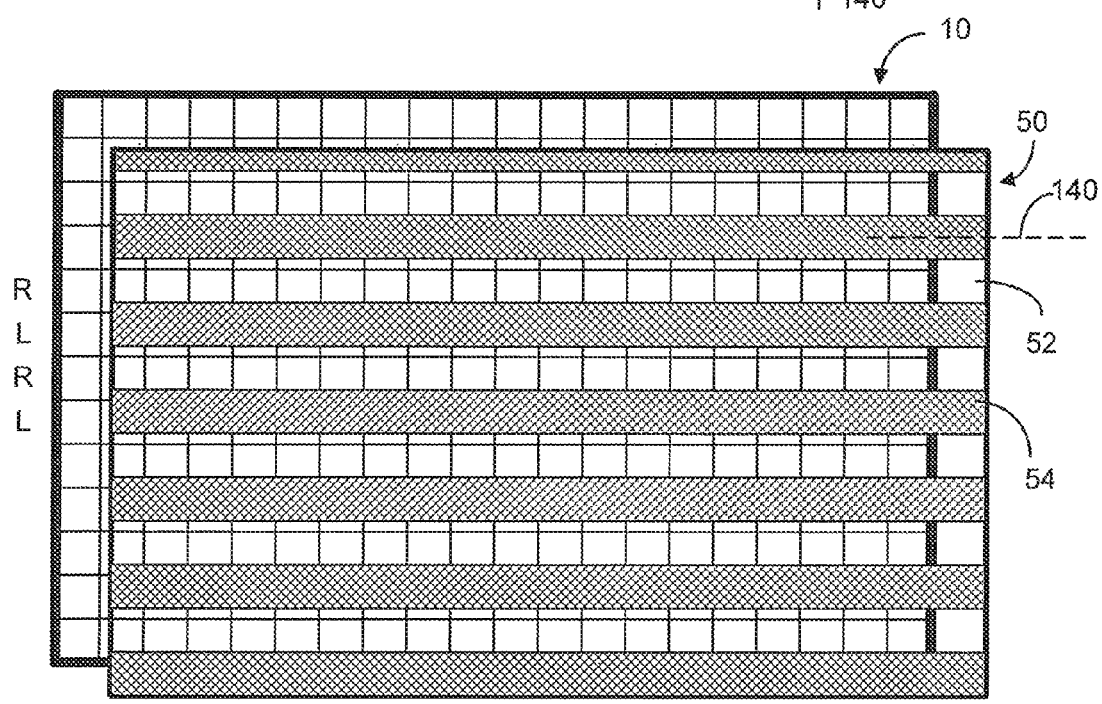

It is also advantageous that the optical parallax barrier panel 50 can be programmed so that the barrier axis can be changed from vertical to horizontal as shown in FIGS. 12a and 12b, for example.

Figures 13A, 13B:
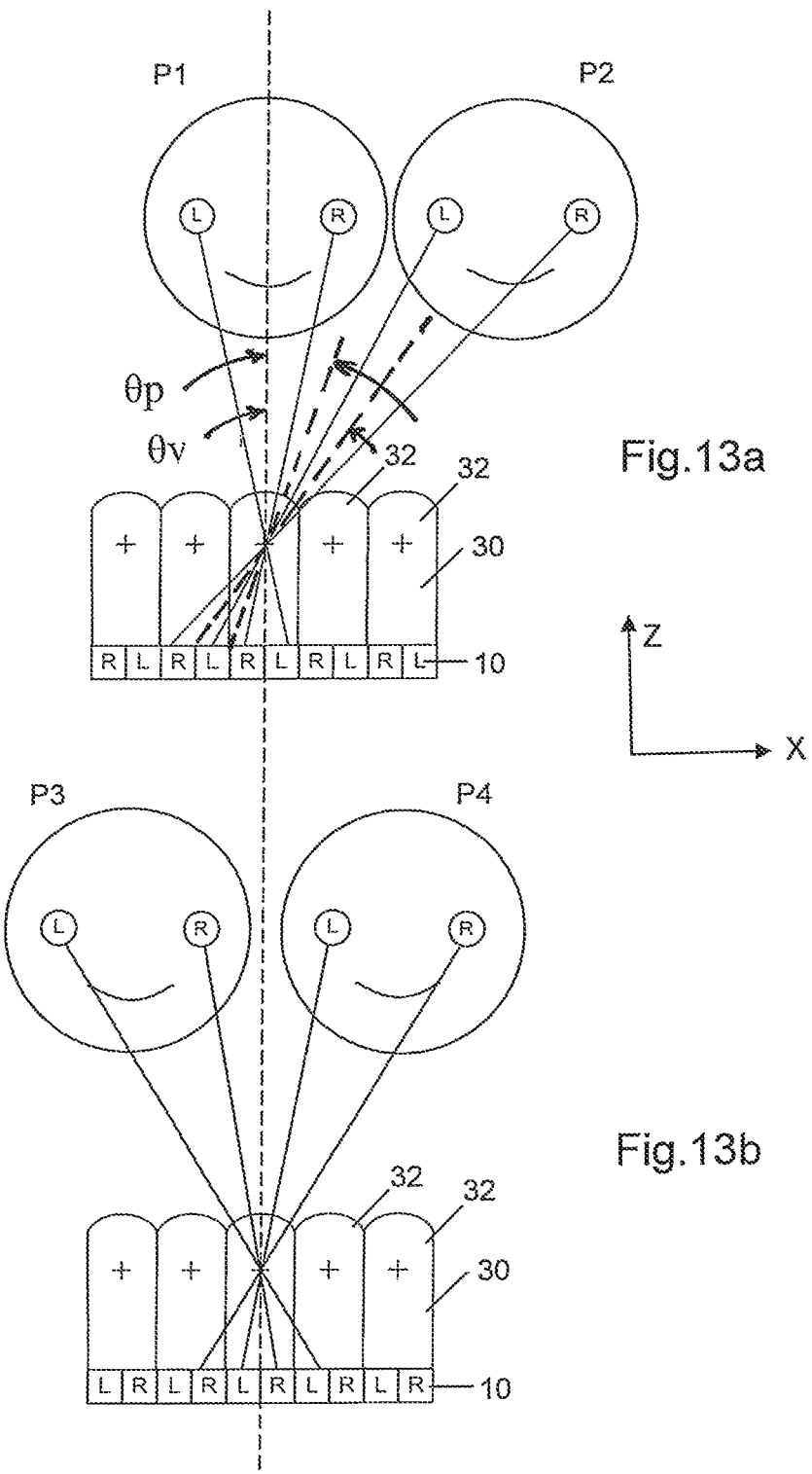
FIG. 13a shows a 3D LCD system with a lenticular screen in relation to a viewer where the left view and the right view under each lenticule are, respectively, located on the right-half and the left-half of the lenticule.
FIG. 13b shows a 3D LCD system with a lenticular screen in relation to a viewer where the left view and the right view under each lenticule are, respectively, located on the left-half and the right-half of the lenticule.

It should be noted that when a viewer is positioned in front of the 3D LCD system, the left view and the right view of the displayed image must be located at the correct sections under a lenticule or a barrier strip so that the left eye can see the left-view image and the right eye can see the right-view image (see FIGS. 4 and 5). As shown in FIG. 13a, when the viewer is positioned at position P1 or P2, for example, the right-view section (R) displayed on the LCD panel 10 is located on the left half of each lenticule 32 of the lenticular screen 30 and the left-view section (L) is located on the right half of each lenticule 32. As such, the left eye of the viewer can see the left-view image and the right eye of the viewer can see the right-view image. When the viewer is positioned at position P3 or P4 as shown in FIG. 13b, for example, the right-view section (R) and the left-view section (L) displayed on the LCD panel 10 must be shifted. As shown in FIG. 13b, the right-view section (R) displayed on the LCD panel 10 is located on the right half of each lenticule 32 of the lenticular screen 30 and the left-view section (L) is located on the left half of each lenticule 32 of the lenticular screen 30. As such, the left eye of the viewer can see the left-view image and the right eye of the viewer can see the right-view image.

Figure 14A:
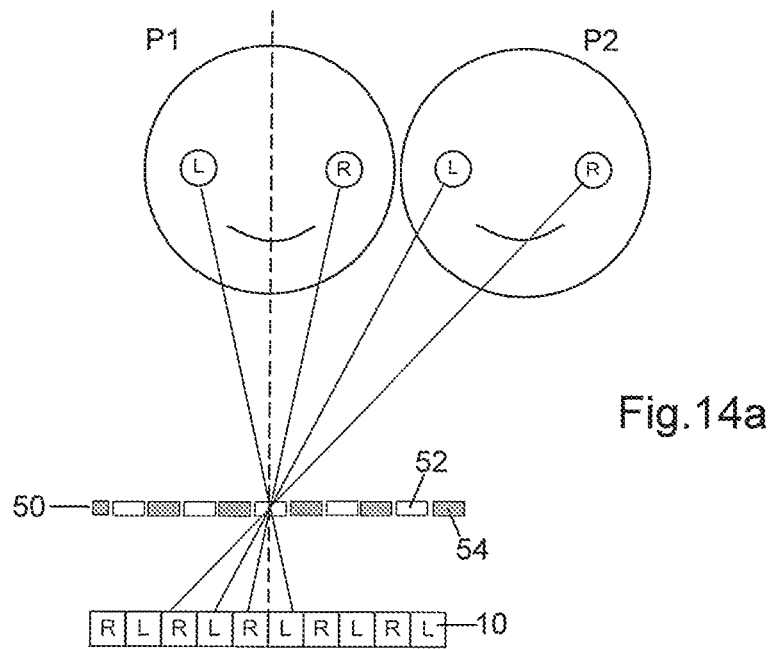
FIG. 14a shows a 3D LCD system with a parallax barrier panel in relation to a viewer where the left view and the right view under each clear barrier strip are, respectively, located on the right-half and the left-half of the clear barrier strip.
Figure 14B:
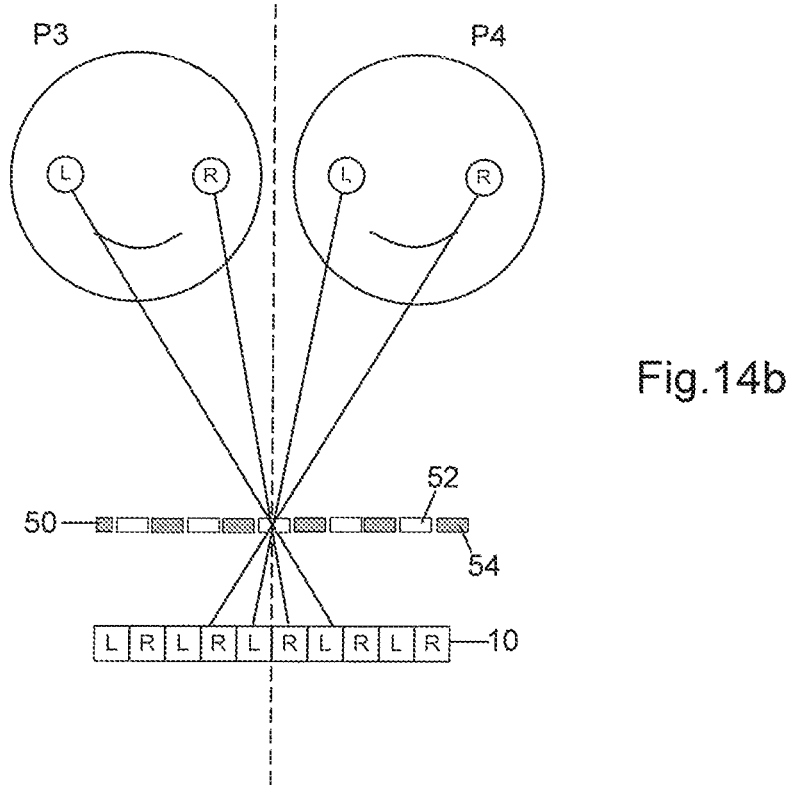
FIG. 14b shows a 3D LCD system with a parallax barrier panel in relation to a viewer where the left view and the right view under each clear barrier strip are, respectively, located on the left-half and the right-half of the clear barrier strip.

Likewise, when the viewer is positioned at position P1 or P2 as shown in FIG. 14a, for example, the right-view section (R) displayed on the LCD panel 10 is located on the left half of each clear strip 52 of the parallax barrier panel 50 and the left-view section (L) is located on the right half of each clear strip 52. As such, the left eye of the viewer can see the left-view image and the right eye of the viewer can see the right-view image. When the viewer is positioned at position P3 or P4 as shown in FIG. 14b, for example, the right-view section (R) and the left-view section (L) displayed on the LCD panel 10 must be shifted. As shown in FIG. 14b, the right-view section (R) displayed on the LCD panel 10 is located on the right half of each clear strip 52 of the parallax barrier panel 50 and the left-view section (L) is located on the left half of each clear strip 52. As such, the left eye of the viewer can see the left-view image and the right eye of the viewer can see the right-view image.

Figure 15:
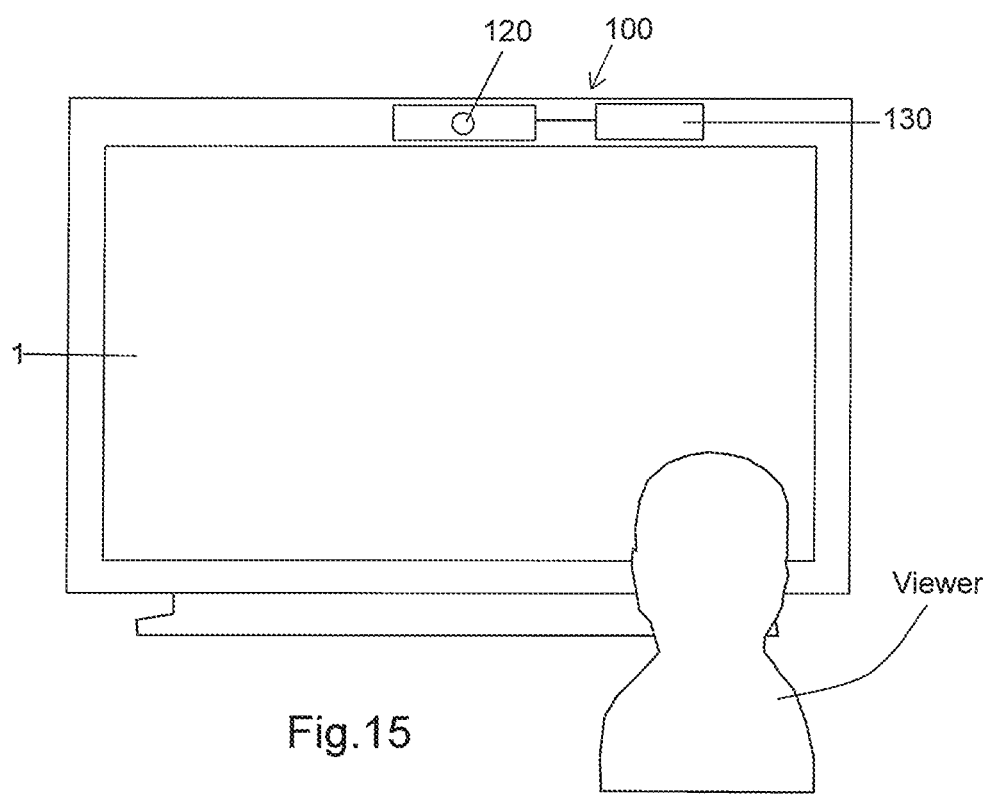
FIG. 15 is a schematic representation of a display having a tracking device for monitoring the location of the viewer.

According to one embodiment of the present invention, a tracking device is used to monitor the position of a viewer in relationship to the 3D LCD system in order to determine the positions of the left-view image and the right-view image under a lenticular screen 30 or a parallax barrier panel 50. As shown in FIG. 15, in a display 100 having a 3D LCD system 1, a tracking device 120 is used to track the location and the movement of a viewer and a processor 130 is used to determine the locations of the left and right view sections. The tracking device 120 can be an optical sensing device, such as one or two digital cameras and a sonic device, to measure the distance between the two eyes of a viewer and the distance of the viewer from the display. In one embodiment of the present invention, based on the input data from the tracking device 120, the processor 130 is configured to determine the location of a viewer in terms of a viewer's angle θv in relation to the Z axis as compared to the lenticular angle θp as shown in FIG. 13*a*. If θv is between −θp/4 and θp/4, or between θp(3/4) and θp(5/4), then the right-view section (R) displayed on the LCD panel 10 is located on the left half of each lenticule 32 of the lenticular screen 30 and the left-view section (L) is located on the right half of each lenticule 32 as shown in FIG. 13*a*. If θv is between θp/4 and θp(3/4), or between −74 p(3/4) to −θp/4, then the right-view section (R) displayed on the LCD panel 10 is located on the right half of each lenticule 32 of the lenticular sheet 30 and the left-view section (L) is located on the left half of each lenticule 32 as shown in FIG. 13*b*. It should be understood that FIGS. 13*a* and 13*b* depict the shifting of left-view and right view sections when each half of the lenticule 32 shows only one view-section (L or R) as shown in FIG. 4. In such a case, the arrangement of (L, R) in each lenticule 32 is shifted to become (R, L) when a viewer changes his/her position along the X direction. When the viewer further changes his/her position along the same direction, then the arrangement can be shifted again to (L, R) and so on. If each half of the lenticule 32 shows two view-sections in two different columns (V1 and V2 for RV, V3 and V4 for LV) as shown in FIGS. 8*a* and 8*b*, then the shifting is carried out in a finer step. For example, due to the change of a viewer position along the X direction, the arrangement of (V1, V2, V3, V4) in each lenticule 32 can be shifted to become (V2, V3, V4, V1) and then (V3, V4, V1, V2) if the viewer further changes the position along the same direction.

In summary, the present invention provides a viewing system and a method for making same. The viewing system comprises a liquid crystal display panel as depicted in FIGS. 2 and 3 wherein the sub-pixel areas in a pixel are arranged in the pixel area along the Y direction; and a parallax separation device, such as a lenticular screen as depicted in FIGS. 3 and 4, or a parallax barrier panel as depicted in FIGS. 5 and 6. The parallax barrier panel can be made of a liquid crystal panel or device. The parallax separation device is disposed in relationship to the liquid crystal display panel, the parallax separation device comprising a plurality of parallax separation elements, each parallax separation element having a longitudinal axis defining a parallax barrier axis of the parallax separation device, wherein the parallax barrier axis is substantially parallel to the Y direction.

The liquid crystal display panel is configured for displaying a composite image comprising a plurality of composite image segments substantially parallel to the parallax barrier axis, and each composite image segment comprises a plurality of displayed sections of different images, wherein each displayed section is displayed in one or more columns, wherein each of the composite image segments has a segment width. In the parallax barrier panel, two adjacent parallax separation elements define a pitch, wherein the pitch is adjustable to match the segment width and/or adjustable in accordance with a viewing distance. The parallax separation element in a parallax barrier panel is formed by the obscure section and the adjacent clear section has an element width and wherein the obscure section has a barrier section width, wherein the barrier section width is adjustable while maintaining the same element width.

According one embodiment of the present invention, the parallax barrier panel made from a light valve or a liquid crystal display panel is operable in a first state and a second state, wherein when the different liquid crystal panel is operated in the first state, the parallax barrier axis is substantially parallel to the second direction, and when the different liquid crystal panel is operated in the second state, the parallax barrier axis substantially parallel to the first direction.

Thus, although the present invention has been described with respect to one or more embodiments thereof, it will be understood by those skilled in the art that the foregoing and various other changes, omissions and deviations in the form and detail thereof may be made without departing from the scope of this invention.

What is claimed is:

1. A viewing system comprising:
    a liquid crystal display panel comprising a plurality of color pixels arranged in a two-dimensional array of rows and columns, the rows arranged along a first direction and the columns arranged along a second direction different from the first direction, each pixel comprising a plurality of color sub-pixels; wherein each pixel has a pixel area and each color sub-pixel has a sub-pixel area and wherein the sub-pixel areas in a pixel are arranged in the pixel area along the second direction;
    a parallax separation device disposed in relationship to the liquid crystal display panel, the parallax separation device comprising a plurality of parallax separation elements, each parallax separation element having a longitudinal axis defining a parallax barrier axis of the parallax separation device, wherein the parallax barrier axis is substantially parallel to the second direction; and
    a tracking device configured to determine a position of a viewer viewing the liquid crystal display panel through the parallax separation device.

2. The viewing system according to claim 1, wherein the liquid crystal display panel is configured for displaying a composite image comprising a plurality of composite image segments substantially parallel to the parallax barrier axis.

3. The viewing system according to claim 2, wherein each composite image segment comprises a plurality of displayed sections of different images, wherein each displayed section is displayed in one or more columns.

4. The viewing system according to claim 2, wherein each of the composite image segments has a segment width, and two adjacent parallax separation elements define a pitch, wherein the pitch is adjustable to match the segment width.

5. The viewing system according to claim 4, wherein the pitch is also adjustable in accordance with a viewing distance.

6. The viewing system according to claim 1, wherein the parallax separation device comprises a lenticular screen having a plurality of lenticules, each lenticule forming a parallax separation element.

7. The viewing system according to claim 1, wherein the parallax separation device comprises a parallax barrier panel, the parallax barrier panel comprising a plurality of obscure sections and clear sections alternately arranged such that an obscure section and an adjacent clear section form a parallax separation element.

8. The viewing system according to claim 1, wherein the first direction is a horizontal direction and the second direction is a vertical direction.

9. The viewing system according to claim 7, wherein the parallax barrier panel comprises a different liquid crystal panel for forming the obscure and clear sections.

10. The viewing system according to claim 9, wherein the parallax separation element formed by the obscure section and the adjacent clear section has an element width and wherein the obscure section has a barrier section width, wherein the barrier section width is adjustable while maintaining the same element width.

11. The viewing system according to claim 9, wherein the different liquid crystal panel operable in a first state and a second state, wherein when the different liquid crystal panel is operated in the first state, the parallax barrier axis is substantially parallel to the second direction, and when the different liquid crystal panel is operated in the second state, the parallax barrier axis substantially parallel to the first direction.

12. The viewing system according to claim 3, wherein the different images comprises images of a scene taken at different angles.

13. The viewing system according to claim 3, wherein different images comprise images of different scenes.

14. A method for use in a viewing system, the viewing system comprising
a liquid crystal display panel comprising a plurality of color pixels arranged in a two-dimensional array of rows and columns, the rows arranged along a first direction and the columns arranged along a second direction different from the first direction, each pixel comprising a plurality of color sub-pixels; wherein each pixel has a pixel area and each color sub-pixel has a sub-pixel area, said method comprising:
arranging the sub-pixel areas in the pixel area along the second direction;
providing a parallax separation device in relationship to the liquid crystal display panel, the parallax separation device comprising a plurality of parallax separator elements, each parallax separator element having a longitudinal axis defining a parallax barrier axis of the parallax separation device, wherein the parallax barrier axis is substantially parallel to the second direction; and
determining a position of a viewer viewing the liquid crystal display panel through the parallax separation device so as to arrange a displayed image in the liquid crystal display panel in relationship to the parallax separator elements at least partly based on the position of the viewer.

15. The method according to claim 14, wherein the liquid crystal display panel is configured for displaying a composite image comprising a plurality of composite image segments substantially parallel to the parallax barrier axis.

16. The method according to claim 15, wherein each composite image segment comprises a plurality of display sections of different images, wherein each display section is displayed in one or more columns.

17. The method according to claim 15, wherein each of the composite image segments has a segment width, and two adjacent parallax separator elements define a pitch, wherein the pitch is adjustable to match the segment width.

18. The method according to claim 17, wherein the pitch is also adjustable in accordance with a viewing distance.

19. The method according to claim 14, wherein the parallax separator device comprises a lenticular screen having a plurality of lenticules, each lenticule forming a parallax separator element.

20. The method according to claim 14, wherein the parallax separator device comprises a parallax barrier panel, the parallax barrier panel comprising a plurality of obscure sections and clear sections alternately arranged such that an obscure section and an adjacent clear section form a parallax separator element.

* * * * *